United States Patent [19]

Fujiwara et al.

[11] 3,927,309

[45] Dec. 16, 1975

[54] SIGNAL LEVEL DISCRIMINATION CIRCUIT

[75] Inventors: Susumu Fujiwara, Fujisawa; Takao Okada, Yokohama; Masao Koyama, Hatano; Hiromitsu Akashi; Yoichi Nishikawa, both of Hiratsuka, all of Japan

[73] Assignee: The Yokohama Rubber Company, Ltd., Japan

[22] Filed: Oct. 4, 1974

[21] Appl. No.: 512,164

[30] Foreign Application Priority Data

Oct. 9, 1973 Japan .............................. 48-112850

[52] U.S. Cl. ..... 235/151.31; 325/42; 340/146.3 AE; 340/146.3 S; 340/347 AD; 328/118; 328/135

[51] Int. Cl.$^{2}$ ...................... H03K 5/153; H03K 5/18

[58] Field of Search ...... 325/38 B, 42; 340/146.1 R, 340/146.1 AV, 146.3 AE, 146.3 ED, 146.3 S, 347 AD; 328/118, 135; 235/151.31

[56] References Cited

UNITED STATES PATENTS

| | | | |
|---|---|---|---|
| 3,334,298 | 8/1967 | Monrad-Krohn | 328/135 X |
| 3,509,279 | 4/1970 | Martin | 328/135 X |
| 3,671,937 | 6/1972 | Takahashi et al. | 340/146.3 AE |
| 3,737,788 | 6/1973 | Lenz | 328/118 |

*Primary Examiner*—R. Stephen Dildine, Jr.
*Attorney, Agent, or Firm*—Robert E. Burns; Emmanuel J. Lobato; Bruce L. Adams

[57] ABSTRACT

A signal level discrimination circuit comprising a first register for storing a present digital signal, a second register for storing a preceding digital signal which has been stored immediately before the present digital signal, a comparator for effecting comparison of these two digital signals to produce an output signal indicating whether the absolute value of the difference between the two digital signals is greater or less than a predetermined value, and a signal level discrimination output circuit for discriminating whether or not the level of the present signal is the same as that of the preceding signal according to the result of comparison between the difference and predetermined value.

2 Claims, 5 Drawing Figures

SIGNAL LEVEL DISCRIMINATION CIRCUIT

BACKGROUND OF THE INVENTION

This invention relates to electrical waveform processing circuits, and more particularly to circuits in which an information signal and a distortion signal are clearly distinguished from each other to determine the level of the information signal.

In general, a waveform representing an electrical signal including information is liable to include electrical noise which is caused by the information source and the information transmitting system. For instance, in the case where an optical signal and a magnetic signal are automatically read by an optical apparatus and a magnetic apparatus, respectively, noise such as a distortion siganl or overshooting signal is present together with a signal representing necessary information, namely, an information signal.

The levels of such noise can be reduced by the utilization of synchronous timing pulses or can be eliminated by the employment of an automatic gain control circuit. However, when the signal-to-noise ratio S/N of the information signal and the noise is small, it is difficult to eliminate the noise to a sufficient extent by conventional methods as described above. That is, the information signal level discriminated by the conventional methods is erroneous, and is therefore unreliable. Especially in the case where a distortion signal is admixed with the information signal in such a form that the former causes the base level line itself to fluctuate, the discrimination of the information signal level is difficult. This is a great problem to be solved in this art.

SUMMARY OF THE INVENTION

Accordingly, it is an object of this invention to provide a signal level discrimination circuit in which all of the difficulties accompanying the conventional methods described above are overcome.

More specifically, an object of the invention is to provide a signal level discrimination circuit in which, even when a considerably great noise is admixed with an information signal, the latter signal is clearly distinguished from the former to discriminate clearly the level of the information signal.

Another object of the invention is to provide a signal level discrimination circuit in which input signals applied thereto are converted into digital signals so that the operation of the circuit is not affected by noise caused therein.

Briefly, the foregoing objects and other objects are accomplished, according to this invention, by the provision of a signal level discrimination circuit which comprises: an analog-to-digital converter for converting an input analog signal whose level is to be discriminated into a digital signal; a first register for storing the digital signal introduced by the analog-to-digital converter; a second register for storing a preceding digital signal which has been applied to the first register immediately before a present digital signal is stored in the first register; a comparator for comparing the digital signals stored in the first and second registers to produce an output signal indicative of whether the absolute value of the difference of the digital signals is greater or less than a predetermined value; and a signal level discrimination output circuit which, upon receiving the output signal of the comparator, discriminates that the level of the signal stored in the first register is the same as that of the signal stored in the second register when the output signal indicates that the absolute value is less than the predetermined value, second register, discriminates that the level of the signal stored in the first is different from that of the preceding signal stored in the second register when the output signal indicates that the absolute value is greater than the predetermined value.

Various further objects, features and advantages of this invention will be apparent from the detailed description given below, taken in conjunction with accompanying drawings illustrating by way of example a preferred embodiment of this invention.

BRIEF DESCRIPTION OF THE DRAWINGS

In the accompanying drawings:

FIG. 3(*b*) is also a graphical representation indicating the waveform of an ideal signal produced by the camera tube, the signal excluding a distortion signal.

DETAILED DESCRIPTION OF THE INVENTION

A signal level discrimination circuit according to this invention has various uses. However, for convenience in description, the case where it is used for optically reading a mark provided on the surface of a wheel tire will be described.

In general, in reading a mark (or characters) embossed or engraved on a surface, the surfaces of the mark and the surface, that is, the background of the mark, are optically uniform. However, if the optical characteristics of these two surfaces are clearly different from each other, the mark can be read by means of a camera tube. However, such a case as described is rarely experienced, and the optical characteristic of the surfaces are somewhat distorted.

Figure 1:
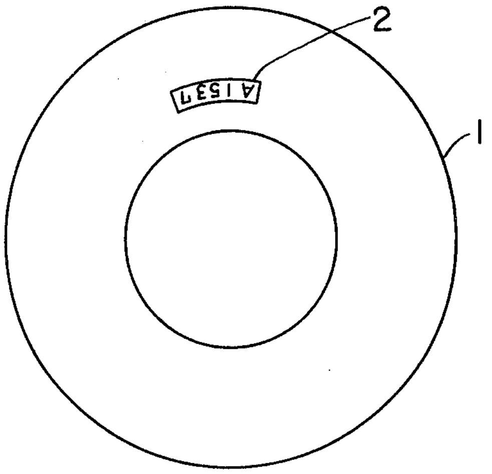
FIG. 1 is a plan view illustrating a mark engraved on the surface of a wheel tire.

FIG. 1 shows a mark 2 engraved on a wheel tire 1. Usually, the surface of the wheel tire is black, and that of the mark is also black. Accordingly, the contrast between the two surfaces is very low. This contrast can be increased if, as is shown in FIG. 2, the surface 3 of the mark 1 is made optically smooth and lustrous while a surface 4 other than the surface 3 (hereinafter referred to as "a background surface 4" when applicable) is optically rough.

Figure 2:
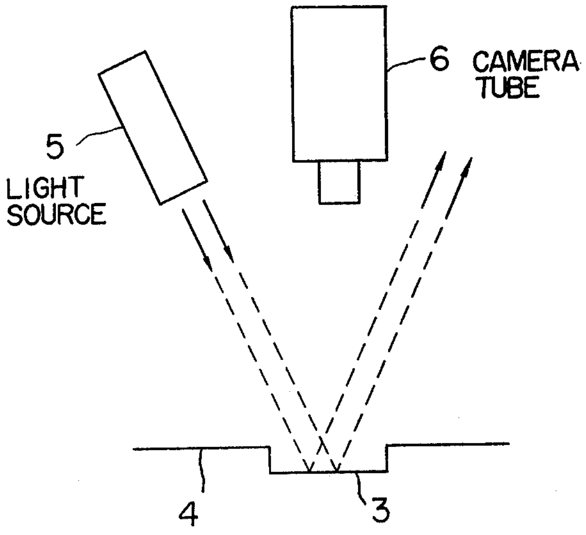
FIG. 2 is an explanatory diagram showing the arrangement of an optical apparatus which reads the mark shown in FIG. 1.

FIG. 2 further shows a light source 5 from which parallel beams are applied to the surface of the tire, and a camera tube 6. If this camera tube 6 is positioned outside the optical path which is formed when the parallel beams from the light source 5 are regularly reflected by the surface of the tire, the quantity of the light beams caught by the camera tube 6 will be small when the parallel beams irradiate the lustrous surface 3, and will be large when the beams irradiate the rough surface 4 because the beams are irregularly reflected thereby. If the surfaces of the mark and the background are thus treated and the light source and the camera tube are arranged in the manner described above, the contrast between the two surfaces 3 and 4 will be improved.

Figure 3A:
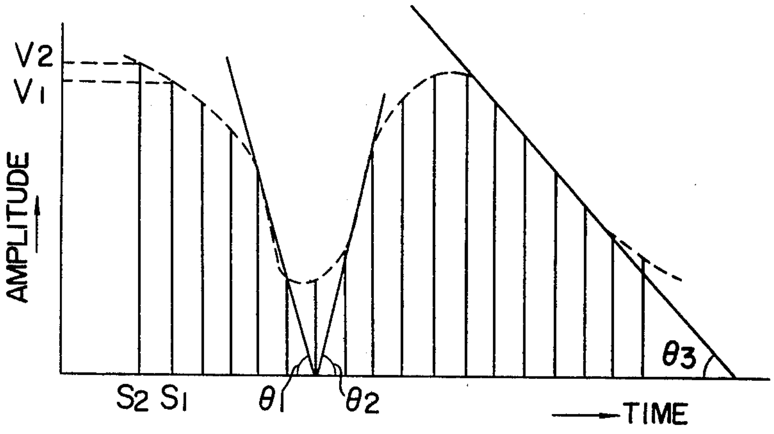
FIG. 3(*a*) is a graphical representation illustrating the waveform of a signal produced by a camera tube in the optical apparatus, the signal including a distortion signal.
Figure 3B:
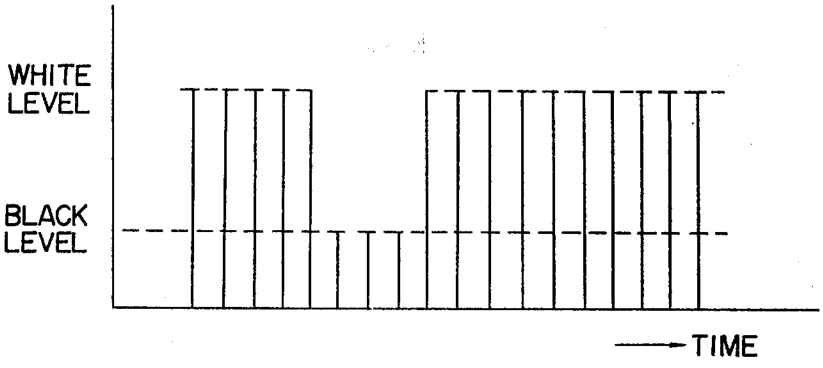

However, the mark surface 3 and the background surface 4 are still optically ununiform. Therefore, an electrical output signal from the camera tube 6 includes large distortion signals. In addition, the intensity of irradiation light from the light source 5 is also ununiform in distribution, and the camera tube 6 itself has various kinds of distortion characteristics. Accordingly, if the electrical output signal of the camera tube 6 is subjected to digital conversion, the resultant signal will be as indicated in FIG. 3(*a*). If, when the level of this signal is discriminated, that is, it is discriminated as to whether it is a black level or a white level, a threshold level is fixed, a completely erroneous discrimination will result. In FIG. 3, the horizontal axis represents time, while the vertical axis represents the amplitudes of the digital signals.

Distortions of the parabola and shaded part may be reduced to some extent by the provision of an automatic gain control circuit. However, it is rather difficult to correct the distortion obtained when the mark surface having an optical distortion variable with time is scanned and also the fluctuation within one scanning, and it is not recommended that the correction be effected thoughtlessly, because it may cause the elimination of information signals necessary for the detection of the mark.

When the information signal and the distortion signal are compared with respect to their frequency components, the latter is much smaller than the former, which leads to the distinction of the information signal from the distortion signal. The present invention is based on this result.

In other words, as is shown in FIG. 3(*a*), variation of the information signal is greater than that of the distortion signal: $\theta_1$ or $\theta_2 > \theta_3$. The invention has been developed from this principle. That is, the difference between the succeeding digital signals $S_1$ and $S_2$ is compared with a certain value, to discriminate the levels of the signals.

If it is assumed that for instance, the signal $S_1$ has an amplitude $V_1$ while the signal $S_2$ has an amplitude $V_2$, the absolute value of the difference between these two amplitudes is then represented by $|V_1-V_2|$. This absolute value is compared with a predetermined value $\Delta V_0$. In this case, if $|V_1-V_2|<\Delta V_0$, it is determined that the level of the signal $S_2$ is the same as that of the signal $S_1$; and if $|V_1-V_2|>\Delta V_0$, it is determined that the level of the signal $S_2$ is different from that of the signal $S_1$. when the signals are analyzed in this manner, the levels of the information signals can be discriminated without errors even if a distortion signal which is of a magnitude such as to change the base level line exists together with the information signal.

Figure 4:
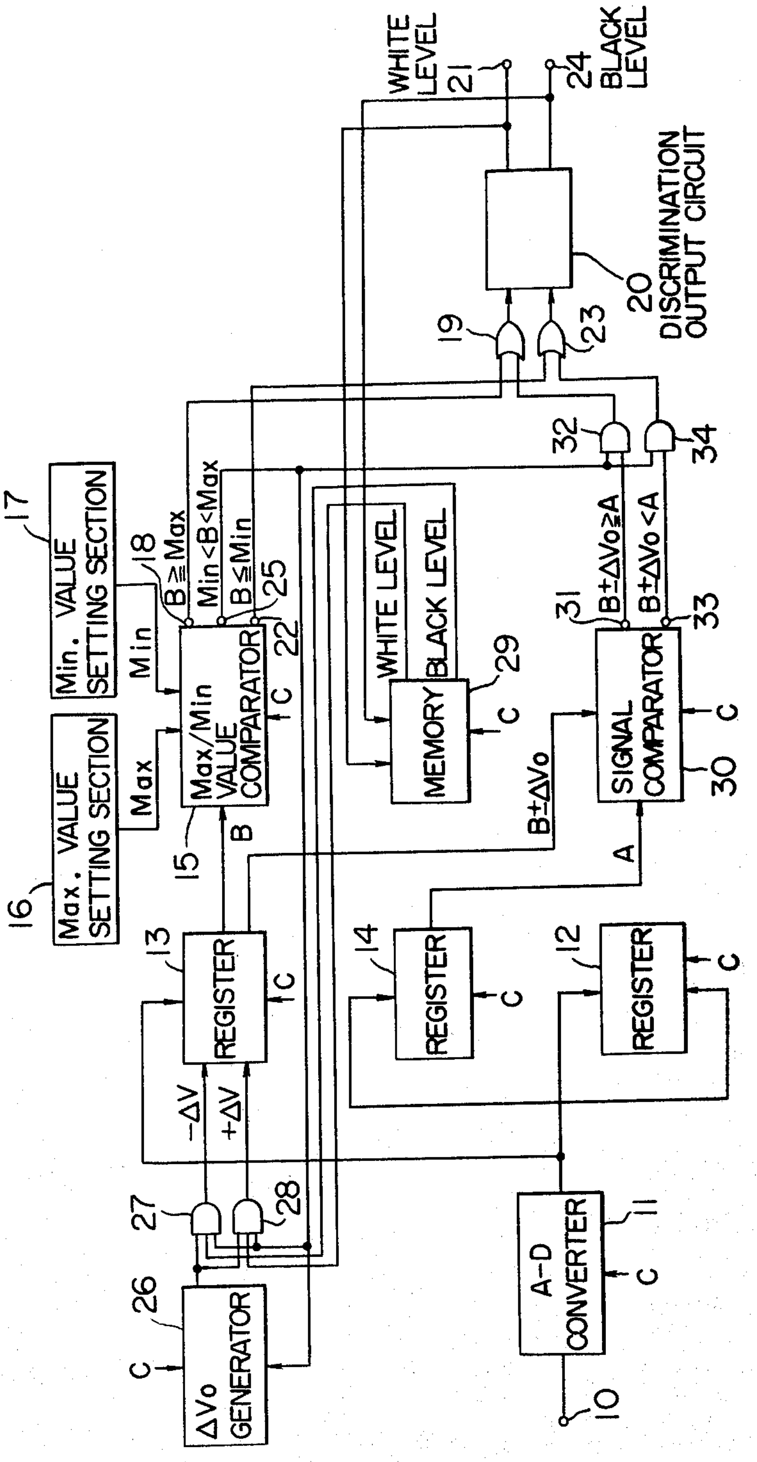
FIG. 4 is a block diagram illustrating one example of the signal level discrimination circuit according to this invention.

One example of the signal level discrimination circuit according to this invention is shown in FIG. 4. An input signal including a distortion signal as shown in FIG. 3(*a*) is applied to an input terminal 10 of the circuit. The input signal is an analog signal, which is converted into a digital signal by an analog-to-digital converter 11. The digital signal thus obtained is introduced to a first register 12 and a second register 13.

The digital signal stored in the first register 12 is transferred to a third register 14 at the time instant when the next digital signal is applied to the first register 12. More specifically, at this time instant, this succeeding digital signal is stored, as a new digital signal, in the first register 12 and the second register 13, while the preceding signal, or the digital signal firstly stored in the first register, is transferred to the third register 14.

For convenience in description, that the new digital signal stored in the registers 12 and 13 is designated by $S_2$, while the preceding signal is designated by $S_1$, that the signals $S_2$ and $S_1$ having amplitudes B and A, respectively. Furthermore, it is assumed that the level of the signal $S_1$ has been determined and the level of the signal $S_2$ is to be determined.

First, the amplitude B of the signal $S_2$ stored in the second register 13 is applied to a comparator 15 so that the value of the amplitude B is compared with a maximum value Max and a minimum value Min which are set respectively in a maximum value setting section 16 and a minimum value setting section 17 (the comparator 15 being hereinafter referred to as "a maximum/-minimum value comparator 15" when applicable).

When the value of the amplitude B of the signal $S_2$ is equal to or greater than the maximum value Max, the comparator 15 produces an output signal at its first output terminal 18. This output signal is introduced through an OR gate 19 to a signal level discrimination output circuit 20. In this case, the circuit 20 produces a white level signal at its first terminal 21.

When the value of the amplitude B os the signal $S_2$ stored in the second register 13 is equal to or less than the minimum value Min mentioned above, the comparator 15 produces an output signal at its third output terminal 22. This output signal is introduced through an OR gate 23 to the signal level discrimination output circuit 20. In this case, the circuit 20 produces a black level signal at its second terminal 24.

Since the signal level is discriminated by comparing the value of the amplitude of the signal with the maximum value and the minimum value as was described above, the discrimination of the signal level can be carried out without errors even if the level line is continuously, slowly and greatly varied by the distortion signal.

When the value of the amplitude B of the signal $S_2$ is less than the maximum value Max and is greater than the minimum value Min, the max/min value comparator 15 produces an output signal at its third output terminal 25. This output signal is applied to a generator 26 which is adapted to generate a predetermined value $\Delta V_0$ (hereinafter referred to as "a $\Delta V_0$ generator 26" when applicable) and also to AND gates 27 and 28 which are connected to the output of the $\Delta V_0$ generator 26. The signal $\Delta V_0$ from the $\Delta V_0$ generator 26 and a signal from a memory 29 which stores information at the level of the signal $S_1$ whose amplitude A has been already discriminated, are applied to the AND gates 27 and 28.

More specifically, when the amplitude A is at the black level, the signal from the memory 29 is applied to the AND gate 27; and when the amplitude A is at the white level, the signal from the memory 29 is applied to the AND gate 28.

If the preceding signal $S_1$ is at the black level, the signal $\Delta V_0$ which is negative will be applied through the AND gate 27 to the second register 13. Accordingly, the signal B stored in the second register 13 will be subtracted by the signal $\Delta V_0$, that is, a signal representing a value $B-\Delta V_0$ will be applied to a signal comparator 30 to which a signal representing the amplitude A of the preceding signal $S_1$ is applied from the third register 14. If $B-\Delta V_0 \geqq A$, the signal comparator 30 will produce an output signal at its first output terminal 31. This output signal is applied to one of the input terminals of an AND gate 32, while the signal from the max/-min value comparator 15 is applied through its third terminal 25 to the other input terminal of the AND gate 32. Accordingly, the AND gate 32 is rendered conductive. Therefore, the output signal from the signal comparator 30 is introduced through the AND gate 32 and the OR gate 19 to the signal level discrimination output circuit 20. Thus, the circuit 20 provides the white level signal at its first output terminal 21.

The inequality $B-\Delta V_0 \geqslant A$ described above is equal to an inequality $B-A \geqq \Delta V_0$. Therefore, it is discriminated that the level of the signal $S_2$ is different from that of the signal $S_1$, that is, it is the white level.

In the case of $B-\Delta V_0<A$, on the other hand, the signal comparator 30 produces an output signal at its second terminal 33. This output signal is introduced through the AND gate 34 and the OR gate 23 to the signal level discrimination output circuit 20. In this case, the circuit 20 provides the black level signal at its second output terminal 24. The expression $B-\Delta V_0<A$ is equal to the expression $B-A<\Delta V_0$. Accordingly, it is discriminated that the level of the signal $S_2$ is the same as that of the signal $S_1$, that is, it is the black level.

The level signal thus provided at the output terminal 21 or 24 is applied to the memory 29, as a result of which the memory 29 now stores information at the discriminated level of the signal $S_2$ in place of that of the signal $S_1$.

The operation of the signal level discrimination circuit according to this invention has been described in connection with the case where the level of the preceding signal $S_1$ is the black level. However, it should be noted that substantially the same operation is performed to discriminate the level of the signal $S_2$ in the case also where the level of the preceding signal is the white level.

In this case, the AND gate 28 is rendered conductive and the signal $\Delta V_0$ is positive, this positive signal $\Delta V_0$ being applied to the second register 13. Accordingly, a value $B+\Delta V_0$ is compared with a value A in the signal comparator 30. If $B+\Delta V_0 \geqq A$, the level of the signal $S_2$ will be the same as that of the signal $S_1$, that is, it will be the white level. If $B+\Delta V_0<A$, the level of the signal $S_2$ will be the black level which is different from the level of the signal $S_1$.

As is indicated in FIG. 4, a control signal C is applied to the analog-to-digital converter 11, the first register 12, the second register 13, the third register 14, the comparators 15 and 30, and the memory 29 so as to operate them with proper timing.

Thus, in the signal level discrimination circuit according to this invention, even if an information signal and a great distortion signal are mixed together as indicated in FIG. 3(*a*), the level of the information signal can be discriminated exactly, that is, a signal such as that shown in FIG. 3(*b*) can be obtained.

The operation discribed above is not carried out in the case where the threshold value for discriminating the level is fixed. Therefore, it can be said that the signal level discrimination circuit according to this invention is a so-called level discrimination circuit having a floating threshold value. In the signal level discrimination circuit according to this invention, the input signal applied thereto is converted into a digital signal, and therefore no erroneous operation is caused by noise generated in the circuit. This is one of the specific features of the present invention.

The invention has been described in connection with the case where the mark engraved on the surface of the wheel tire is detected by the image camera, the video signal of which is subjected to a discrimination as to whether it is the black level or the white level. However, the circuit according to the invention can be applied to other signal level discriminating circuits.

Furthermore, although only two levels, namely, the black level and the white level are employed for the discrimination of the signal in the above description, more than two levels can be employed. In the latter case, a plurality of values used for comparison are predetermined, and the difference between the succeedingly provided input signals is compared with these predetermined values, for the discrimination of the signal in a multi-level discrimination mode.

What we claim is:

1. A signal level discrimination circuit which comprises:

a. an analog-to-digital converter (11) for converting an input analog signal, whose level is to be discriminated, into a digital signals;

b. a first register (13) for storing the digital signal introduced thereinto by the analog-to-digital converter;

c. a second register (14) storing a preceding digital signal which has been stored in the first register immediately before a present digital signal is stored in the first register;

d. a first comparator (30) in which the present digital signal stored in the first register and the preceding digital signal stored in the second register are compared with each other to produce an output signal indicative of whether the absolute value of difference between the present digital signal and the preceding digital signal is greater or less than a predetermined value; and e. a signal level discrimination output circuit (20) which receives the output signal from the comparator, and discriminates that the level of the present digital signal stored in the first register is the same as that of the preceding digital signal stored in the second register when the output signal from the comparator indicates that the absolute value is less than the predetermined value and that the level of the present digital signal store in the first register is different from that of the preceding digital signal stored in the second register when the output signal from the comparator indicates that the absolute value is greater than the predetermined value.

2. A signal level discrimination circuit as claimed in claim 1 which further comprises:

a. a maximum value setting section (16) for producing a maximum value with respect to said digital signal;

b. a minimum value setting section (17) for producing a minimum value with respect to said digital signal; and c. a second comparator (15) which compares said digital signal with the maximum value and the minimum value produced by the maximum value setting section and the minimum value setting section respectively, and which, when the digital signal is greater than the maximum value or less than the minimum value, produce an output signal to cause said signal level discrimination output circuit to discriminate the level of the digital signal.

* * * * *